(12) United States Patent
Guo et al.

(10) Patent No.: US 9,454,687 B2
(45) Date of Patent: Sep. 27, 2016

(54) BARCODE IMAGING (71) Applicant: Honeywell International Inc., Morristown, NJ (US)

(72) Inventors: Xinqing Guo, Newark, DE (US); Scott McCloskey, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 8 days.

(21) Appl. No.: 14/566,464

(22) Filed: Dec. 10, 2014

(65) Prior Publication Data

US 2015/0161427 A1    Jun. 11, 2015

Related U.S. Application Data

(60) Provisional application No. 61/914,256, filed on Dec. 10, 2013.

(51) Int. Cl.
*G06K 5/04* (2006.01)
*G06K 7/10* (2006.01)
*G06K 7/14* (2006.01)

(52) U.S. Cl.
CPC ........... *G06K 7/10811* (2013.01); *G06K 7/146* (2013.01); *G06K 7/1443* (2013.01); *G06K 7/10831* (2013.01); *G06K 7/10841* (2013.01)

(58) Field of Classification Search
CPC ..................... G06K 7/10811; G06K 7/10831; G06K 7/10841; G06K 7/1443; G06K 7/146
USPC ............................. 235/454, 462.08, 462.23
See application file for complete search history.

(56) References Cited

U.S. PATENT DOCUMENTS

| | | | | |
|---|---|---|---|---|
| 7,296,749 B2 * | 11/2007 | Massieu | ................... | 235/462.23 |
| 7,815,120 B2 * | 10/2010 | Carlson | .................... | 235/462.41 |
| 8,608,073 B2 * | 12/2013 | Baqai et al. | ............. | 235/462.04 |
| 8,820,643 B1 * | 9/2014 | Lei et al. | ................ | 235/462.06 |
| 8,978,984 B2 * | 3/2015 | Hennick et al. | ......... | 235/462.41 |

\* cited by examiner

*Primary Examiner* — Seung Lee
(74) *Attorney, Agent, or Firm* — Brooks, Cameron & Huebsch, PLLC (57) ABSTRACT

Methods, devices, and systems for barcode imaging are described herein. One method includes capturing image data that is used to form an image with a light field imager, wherein the image includes a barcode, locating the barcode within the image, measuring a variance of at least a portion of the barcode region of the image, and refocusing at least a portion of the image based on the measured variance.

20 Claims, 11 Drawing Sheets

BARCODE IMAGING

CROSS-REFERENCE TO RELATED APPLICATIONS

This application is a non-provisional of U.S. Provisional Application Ser. No. 61/914,256, filed Dec. 10, 2013, the entire specification of which is incorporated herein by reference.

TECHNICAL FIELD

The present disclosure relates to methods, devices, and systems for barcode imaging.

BACKGROUND

Barcode readers often have fixed focus optics because mechanical focusing systems lack robustness to mechanical shocks, among other issues. The result is that scanners have limited depth of field, and the onus is on a user to position the object within that depth of field.

Additionally, the acceptable processing time for barcode readers is very short, as they are used in high-throughput settings such as grocery checkout counters. As such, there is a need to develop barcode readers that allow for a larger scanning depth of field while (a) still being robust to mechanical shocks and/or (b) providing a rapid response to the user.

Light field imaging array systems allow a user to capture four dimensional (4D) images that provide additional imaging information than can be provided by typical imaging systems. For example, a light field imaging array system can provide both spatial and angular light ray information. Two such technologies are lenslet based and camera array based light field systems.

However, one drawback to these systems is that the extra data takes more time to process than in traditional two dimensional (2D) image sensors. For example, a light field imaging camera can be used to distinguish an object in the foreground of the image from an object in the background. However, to do so, the image data must be analyzed and the foreground and background data identified. In some applications, this additional processing can take too long for the technology to actually be beneficial.

For example, typically, when light field imaging array systems are utilized, the image data is analyzed, segmented into parts, and several re-focused images are created wherein each corresponding image is focused on different depths within the image as a whole. In order to do this, an objective function (e.g. sharpness) is maximized over the several re-focused images in order to determine the one providing highest contrast, and corresponding to the depth of the barcode in the scene.

An alternative to this approach is to analyze the scene in the Fourier domain, but this is slow because a large matrix must be transformed into the Fourier domain. The processing time of these methods can be slower than is desirable, in some applications.

Further, in the field of barcode technology, the barcode reader, in many implementations, needs to be durable and in that respect the moving parts of some imaging systems, used to create a larger depth of field, can be detrimental to their usage in this field. Readers also, typically, need to scan and provide the information from the barcode quickly and, as such, barcode identification array systems based on light field cameras have not been able to process data fast enough to be beneficial in this field of technology.

DETAILED DESCRIPTION

The present disclosure discusses the concept of extended depth of field scanning with a light field imaging array to identify and/or read barcodes (e.g., one dimensional, two dimensional).

In some embodiments of the present disclosure, the computational complexity of light field barcode re-focusing is addressed by determining the depth of the barcode in a scene directly from the sensor readout. Because this avoids both the Fourier transform and the computation of unneeded refocused images, this improves the scanning time for a light field-based barcode reader. In one method embodiment, a light field camera is used to capture an image and the raw light field image data and its metadata are extracted from the image data file. Metadata can, for example, include the position and spacing of the cameras/microlenses, the exposure time, information about active illumination, and/or sensor specifications, among other information.

In some embodiments, the center pixel of each lenslet can be selected and used to interpolate a center sub-aperture image. Although the quality of this image may be suboptimal, it can serve to guide the search for a barcode on the raw light field image.

In some such embodiments, an image gradient operator can be applied to the center sub-aperture image and the region with highest average gradient can be marked as the barcode region. Then the same region on the raw light field image can be cropped as the barcode region.

In this manner, the image processing can be concentrated on the area of the barcode and, therefore, processing resources and time for processing can be reduced. As used herein, an image gradient operator looks at the data of the image to determine whether the changes in the image intensity (i.e., changes between lightness and darkness in portions of the image) are indicative of a barcode (e.g., drastic changes in intensity from dark to light and light to dark over several pixels in a particular direction within the image data).

Ray tracing can be applied to render the high quality refocused barcode image. An input, called the disparity, to the ray tracing module is equivalent to the depth of the barcode in the scene, which can be estimated, for example, using a linear relationship between the depth of the barcode and the average variance of the lenslet image.

A first look up table can be created to obtain the depth from the variance. A second "distance vs. disparity" look up table can be created to extract the disparity, which amounts to the focal plane when performing ray tracing. In this way, the barcode depth can be approximated and set the correct parameter for ray tracing, among other methods that will be discussed herein.

The exact relationship between the variance and depth depends on the printed size of the elements within the barcode. Because barcodes may be scaled to fit an available space on a product's package, the variance measured in an image could correspond to several different combinations of printed size and depth.

In order to resolve this ambiguity, the observed size of the barcode in the image can be used, for example. This provides a second set of printed size/depth combinations, i.e. a second constraint.

When combined with the depth from variance constraint, this can provide an accurate depth estimate. Such an estimating technique will be discussed in more detail below.

In the following detailed description, reference is made to the accompanying figures that form a part hereof. The figures show by way of illustration how one or more embodiments of the disclosure may be practiced.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

It should be noted that although many of the figures provided herein provided visual views of barcodes and images, the embodiments of the present disclosure can be accomplished by manipulating the data that is used to form the barcodes or images rather than the barcodes or images themselves. Further, as used herein, "a" or "a number of" something can refer to one or more such things. For example, "a number of imaging sensors" can refer to one or more imaging sensors.

Figure 1:
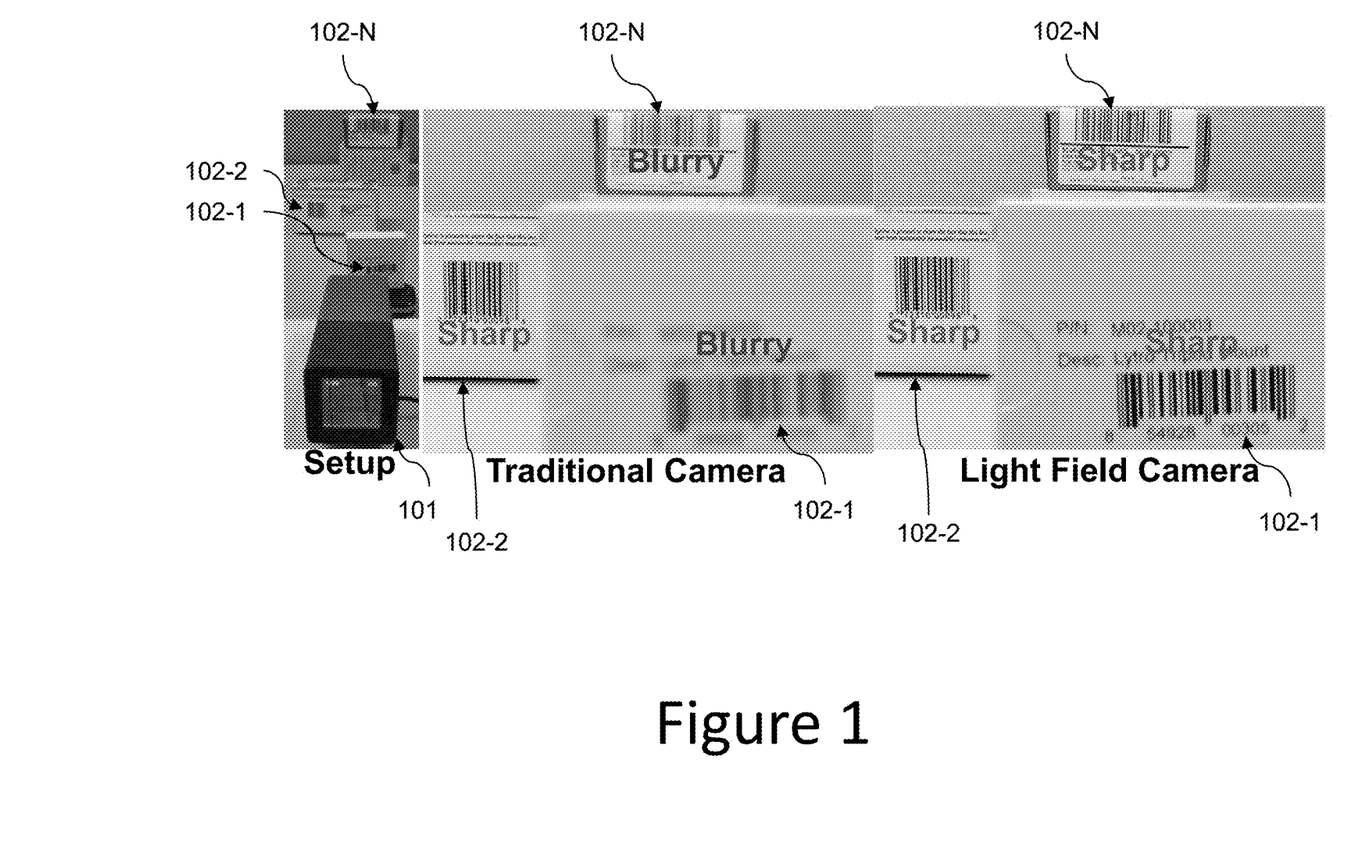
FIG. 1 provides an illustration as to a few advantages of using a light field imaging array system constructed in accordance with an embodiment of the present disclosure.

FIG. 1, provides an illustration as to a few advantages of using a light field imaging array system having imaging sensor 101 (e.g., light field camera constructed in accordance with an embodiment of the present disclosure. As discussed above, one issue in the field of barcode reading is that the depth of field of the imaging system tends to be small and, therefore, many times the barcode is not imaged properly (e.g., blurry), as shown in the traditional camera example of FIG. 1.

In this example, the barcodes at different depths of field shown in the setup image of FIG. 1 (i.e., barcode 102-1 that is close to the imaging sensor, barcode 102-2 that is in a mid-range to the imaging sensor, and barcode 102-N that is far to the imaging sensor) are imaged using a traditional camera in the middle image of FIG. 1. In this example, the camera can resolve the barcode 102-2 in the middle depth of field, but the close and far barcodes are blurry. In the right image of FIG. 1, a light field camera is used according to an embodiment of the present disclosure and all barcodes (102-1, 102-2, and 102-N) are resolved at all depths of field such that they can be read.

Through use of a light field imaging array, the depth of field can be increased (and thereby the ability to sharpen items in multiple depths of field through manipulation of the image data) as shown in the light field camera example of FIG. 1. Another advantage of using a light field imaging array is that these devices can often times be designed to have no moving parts and accordingly can be very durable.

As discussed above, however, it may take too much time to process the image from the light field imaging array. Embodiments of the present disclosure provide techniques for speeding up the processing time in order to make the light field imaging arrays suitable for use in the field of barcode reading.

Figure 2:
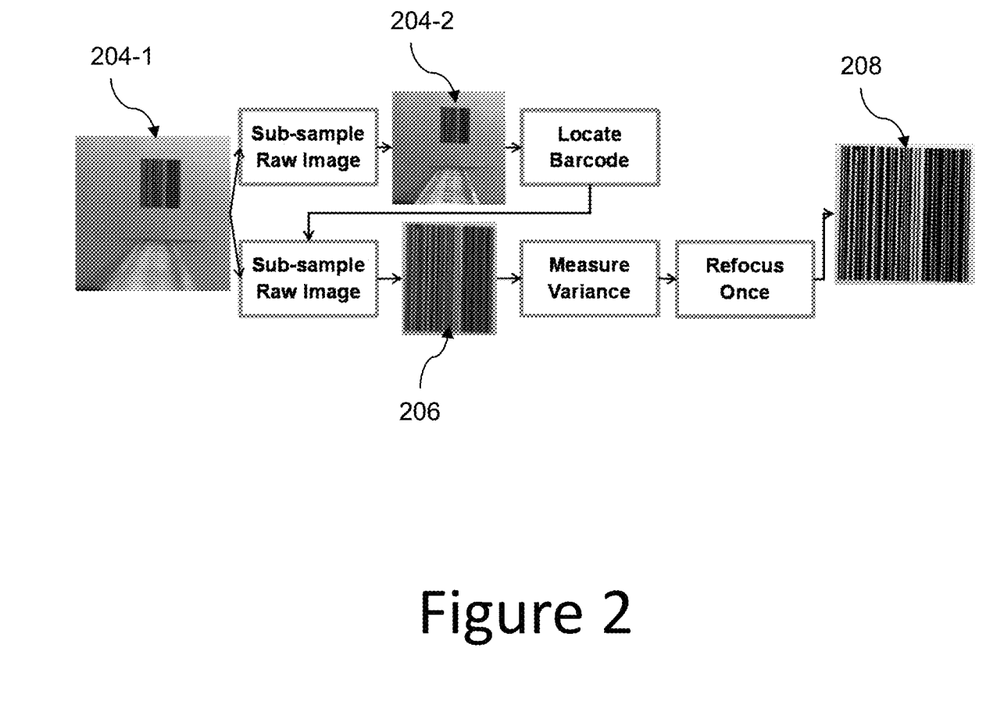
FIG. 2 illustrates a method embodiment for locating and refocusing a barcode in accordance with one or more embodiments of the present disclosure.

FIG. 2 illustrates a method embodiment for locating and refocusing a barcode in accordance with one or more embodiments of the present disclosure. In this method embodiment, a sub-sample image is created (e.g., a sample data set of the image data). For example, the central pixel data from each lenslet (as will be discussed in more detail with respect to FIG. 3) or aperture can be used for such a reduced data set. In this manner, only a small amount of data has to be processed to accomplish location of the barcode, using such a process. Such a sub-sample data set is shown at 204-2 of FIG. 2.

Executable instructions can then be executed by a processor to locate the barcode in this reduced set of data. For instance, a horizontal/vertical gradient comparison can be used to determine the location of the barcode. In this comparison, the pixel intensity of neighboring horizontal and vertical pixels are compared to identify if the pixels being compared indicate a horizontal or vertical line that may represent a barcode.

The full 4D light field data (as visually indicated as 204-1) can then be cropped to remove areas of the image that do not include the barcode, thereby reducing the size of the light field to be refocused. This can be beneficial as processing the reduced image will reduce the amount of processing time and resources used to accomplish the process.

In the example of FIG. 2, the subsample image can be cropped to include substantially only the barcode 206 and a pixel variance measured which can be used to refocus the cropped full 4D light field data to provide the sharpened barcode 208.

Figure 3:
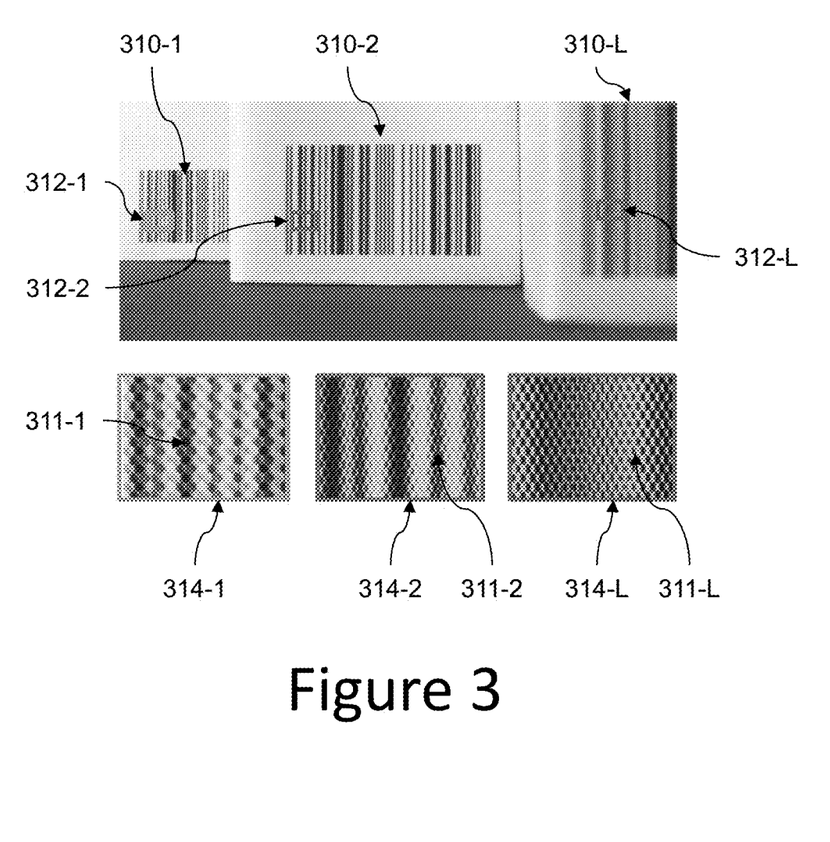
FIG. 3 illustrates different lenslet image patterns for barcodes positioned at different depths of field which can be used in accordance with one or more embodiments of the present disclosure.

FIG. 3 illustrates different lenslet image patterns for barcodes positioned at different depths which can be used in accordance with one or more embodiments of the present disclosure. Light field cameras can include a microlens array in front of a sensor. Light field cameras can also be an array of sensors is used instead of a microlens array in front of a sensor and such cameras can be utilized in various embodiments of the present disclosure. In embodiments where microlenses are utilized, these microlenses (lenslets) diverge light rays (i.e., electromagnetic radiation) based on the directions of the rays and their interaction with the microlenses.

Therefore, the resultant raw light field image can potentially contain, for example, hundreds of thousands of lenslet images. When looking closely, barcodes positioned at different depth exhibit different lenslet image patterns. For example, in the left images in FIG. 3, taken at a far distance, each lenslet 311-1 of image 314-1, taken from the area 312-1 of barcode 310-1, shows uniform color (white, gray, black lenslet image characteristics), indicating the image plane of the main lens coincides with the plane of the microlens array.

As the barcode moves nearer to the camera, increasing intensity variations are evident in lenslet images. For example, in the middle images in FIG. 3, taken at a middle distance, each lenslet 311-2 of image 314-2, taken from the area 312-2 of barcode 310-2, shows mix of colors (each lenslet image may have a combination of white, gray, and/or black lenslet image characteristics).

Further, in the right images in FIG. 3, taken at a close distance, each lenslet 311-L of image 314-L, taken from the area 312-L of barcode 310-L, shows mix of colors (each lenslet image will likely have a combination of many white, gray, and/or black lenslet image characteristics). Based on this observation, it appears that these characteristics can be used for depth estimation of an object in an image, such as a barcode.

Figure 4:
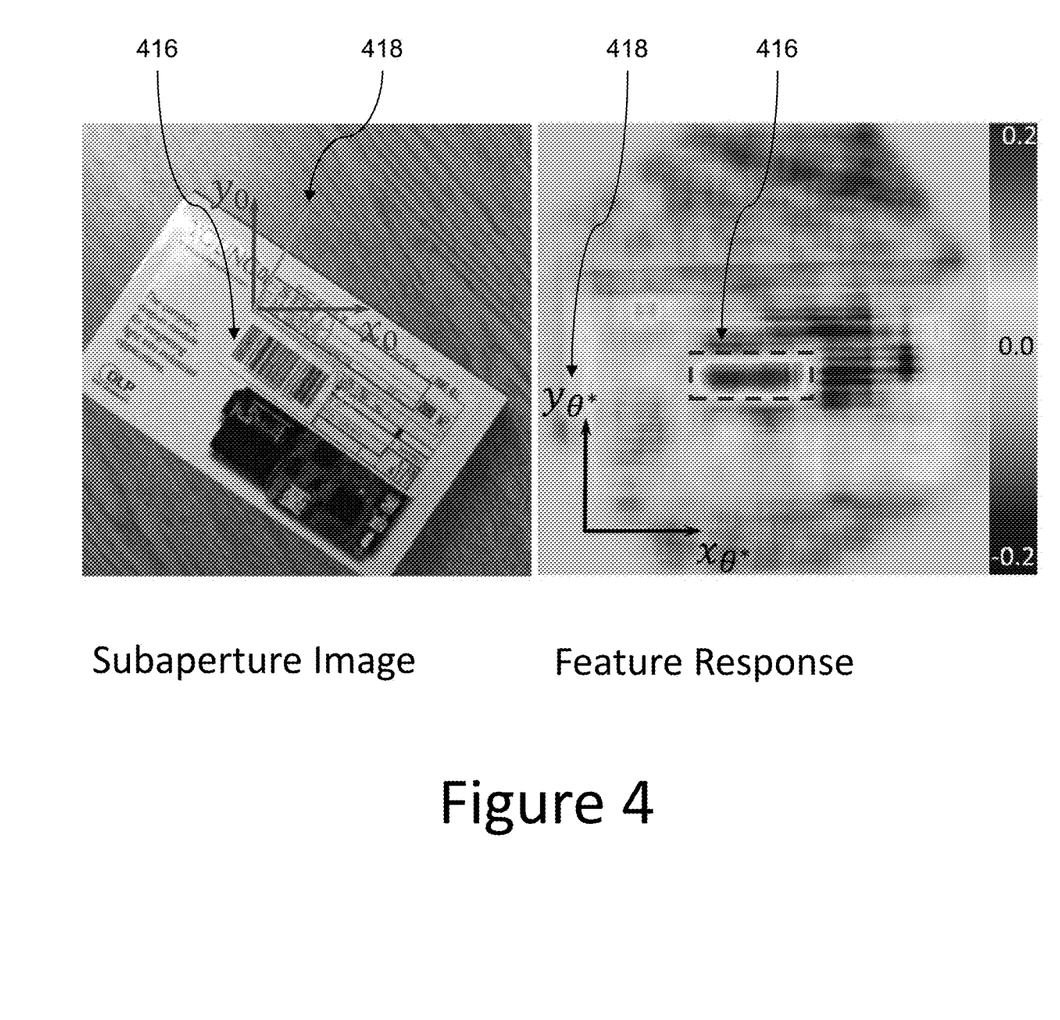
FIG. 4 provides an illustration of a barcode localization process for use in accordance with an embodiment of the present disclosure.

FIG. 4 provides an illustration of a barcode localization process for use in accordance with an embodiment of the present disclosure. In the process illustrated in FIG. 4, the image can be preprocessed to aid in the locating of the barcode. For example, the image can be devignetted and/or demosaicized.

To get the sub aperture image, the center of each lenslet image can be precalibrated to a calibration value. A pixel in each lenslet (e.g., center pixel) can then be selected to generate a central sub-aperture image. Interpolation can be used since the lenslet arrangement is hexagonal in many applications.

Although the sub-aperture image is of low resolution (e.g., 328×378), which inhibits direct decoding, it is detailed enough for barcode localization. To locate the barcode, a feature response for a different angle can be computed with a computing device to determine the angle of orientation. Then a box filter can be applied to get locally averaged feature response to identify a box shaped item in the image (potential box shaped barcode) with the angle of orientation. The potential barcode region is identified by a connected region of constantly high average response.

The shape of this region 416, due to it likely being a barcode, also needs to be tightly bounded by an oriented rectangle. Within this rectangle, the size of the candidate barcode can be computed as the distance between the first and the last elements. In order to eliminate the effects of illumination variations, the input sub-aperture image can be preprocessed using local histogram equalization.

Figure 5:
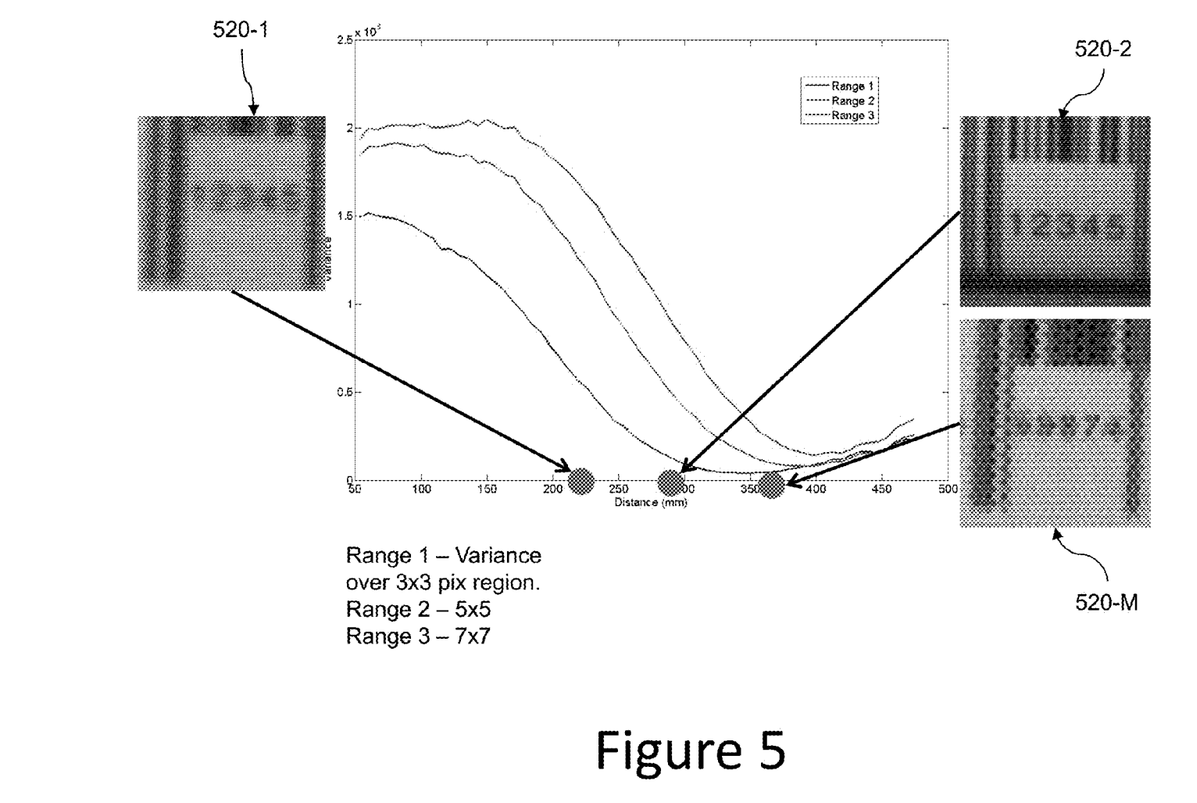
FIG. 5 illustrates a method of estimating the depth of the barcode in accordance with one or more embodiments of the present disclosure.

FIG. 5 illustrates a method of estimating the depth of the barcode in accordance with one or more embodiments of the present disclosure. As discussed previously with respect to FIG. 3, the depth of field at which a barcode is located can be determined based upon the variance of the lenslet images. This enables the barcode's depth to be estimated before refocusing, saving time relative to previous approaches.

In the example embodiment of FIG. 5, when the main lens focuses the barcode on the lenslets, variance within the 9×9 pixel patch is nearly 0. The variance increases with barcode's distance from the depth.

In the examples shown in FIG. 5, an image from a closest depth is shown at 520-1 along with its estimated distance identified on the graph shown based upon the amount of variance as compared to the other images at other depths. Images 520-2 (at a middle depth) and 520-M (at a farthest depth) are shown with their corresponding graphs where the variance is quantified and that analysis can be correlated to an estimate of the distance from the camera.

In some embodiments, a lookup table can be built to translate variance to depth based upon multiple images from different depths. This look up table can then be used to predict the depth of the barcodes without doing the actual analysis discussed above.

This may be beneficial in making the estimation take less time and/or use less computing resources, allowing this process to be useful for more applications. In some embodiments, depth can be determined using the known size of the barcode. Some such embodiments can be combined with the methods discussed above, for example, to improve the accuracy of the estimation, which can be used to improve the sharpening of the barcode.

Figure 6:
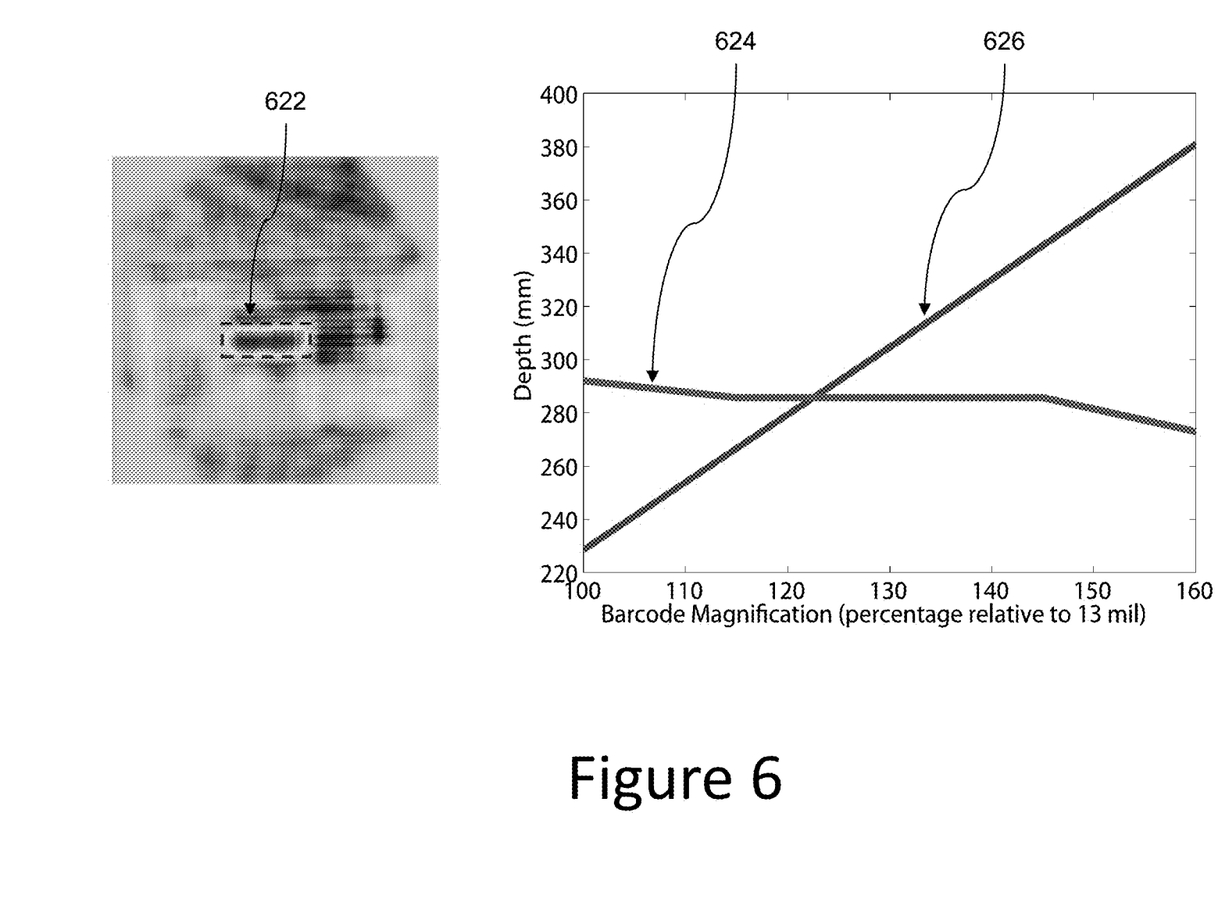
FIG. 6 illustrates a method of estimating depth based on barcode size in accordance with one or more embodiments of the present disclosure.

FIG. 6 illustrates a method of estimating depth based on barcode size in accordance with one or more embodiments of the present disclosure. In the embodiment shown in FIG. 6, an image of a barcode 622 is captured. From that image, and knowledge of possible sizes of barcodes (e.g., standard barcode sizes and/or barcode sizes that are commonly scanned by a particular type of equipment or in a particular environment) the barcode depth can be estimated, for example, based on an analysis as shown in the chart on the right side of FIG. 6.

In this analysis, from projective geometry, the relationship between the barcode image size and the depth can be obtained. The right figure illustrates the depth determination strategy.

In this strategy, given a detected barcode size, the larger the barcode's original size, the further its distance. Given a measured variance, another size vs. depth curve can be formed by collecting depths from the look-up tables for corresponding barcode sizes.

The original barcode size and the depth are therefore indicated by the intersection of these two lines/curves (depth from barcode image size 626 and the depth from barcode variance 624). In some embodiments, these values can be built into two look-up tables, and thereby, the depth can be easily retrieved once the size and variance of the barcode have been identified.

Figure 7A:
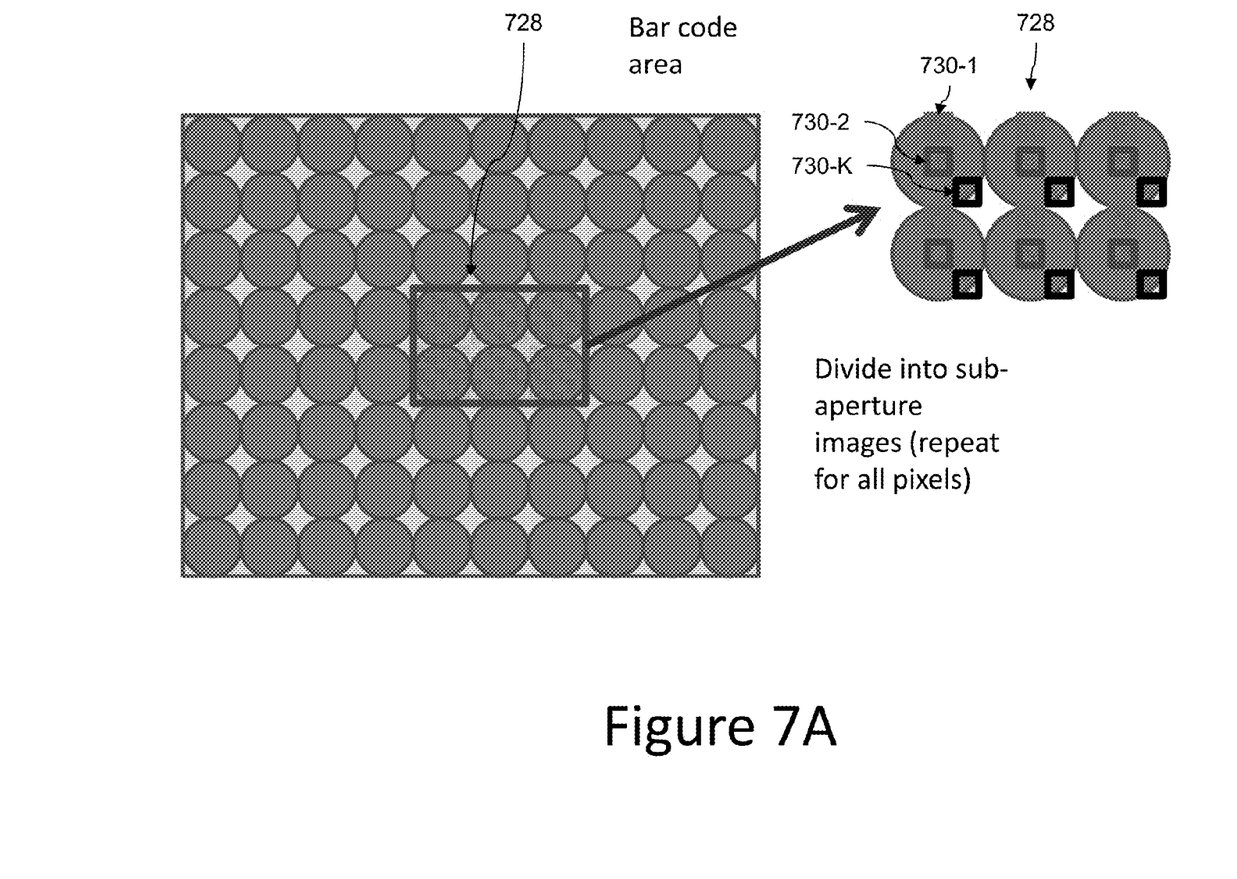
FIGS. 7A and 7B provide an illustration of a method of creating a sharpened image using cross-correlation in accordance with an embodiment of the present disclosure.
Figure 7B:
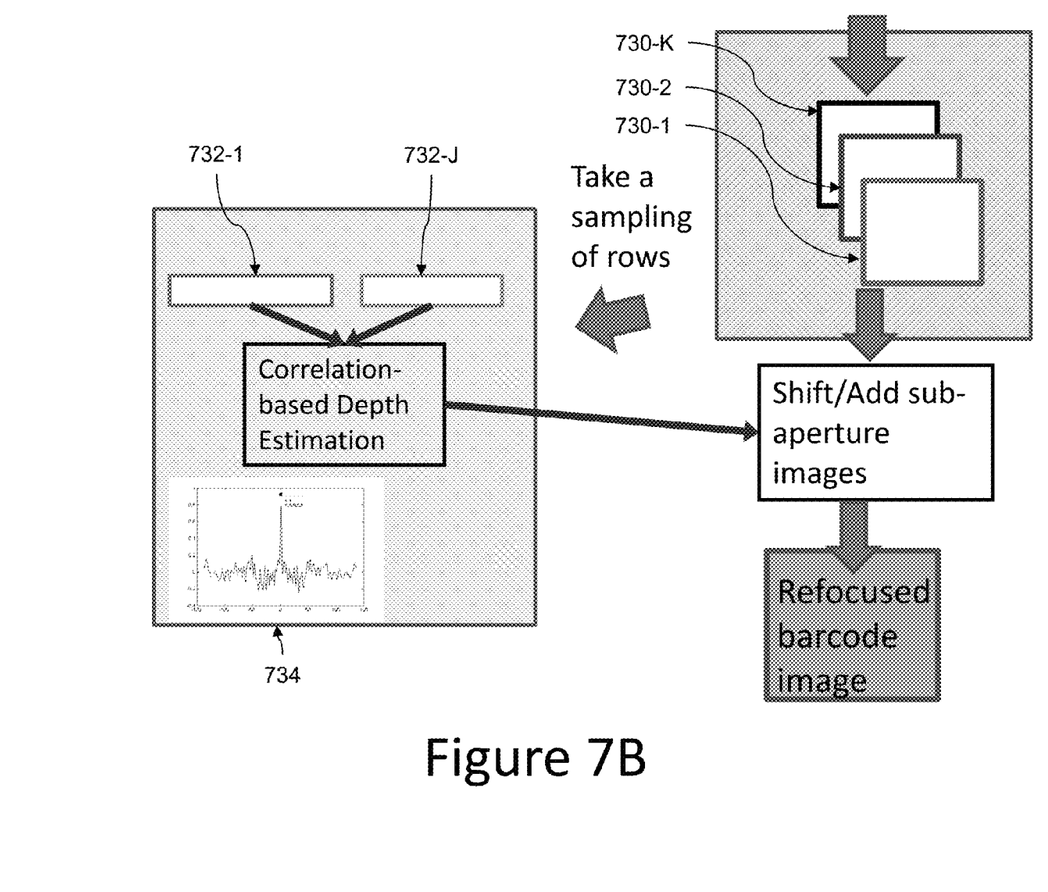

FIGS. 7A and 7B provide an illustration of a method of creating a sharpened image using cross-correlation in accordance with an embodiment of the present disclosure. In this embodiment, a focused image is built by shifting then adding sub-aperture images. An example portion of a barcode image is shown at 728 within a larger barcode area (large rectangle) having a number of lenslets (circles). In this, example, the area has six images each created by six different microlenses. Within each image are a number of pixels. The image can therefore be broken down into smaller parts, for example, into individual pixel image portions.

In the embodiment of FIGS. 7A and 7B, pixel portions 730-1, 730-2, and 730-K each represent a pixel in the upper left microlens image. These three pixel portions each represent a sub-aperture image.

Pixels in nearby microlens images that correspond to the positions of those from the first image can be compared to identify a shift in the variance. Since the microlenses are of a uniform size and are spaced in a uniform manner, the shift identified can be correlated to a distance.

For example, in some embodiments, a row of pixels can be compared to a nearby row of pixels (e.g., 732-1, 732-J)

to determine the cross-correlation and that pattern can thereby be used to determine a shift. The shift and the distances of the microlenses can be used to determine the distances between the pixels.

Based on the observed differences in variances, the barcode can be sharpened. In this manner, the depth or size of the barcode does not have to be ascertained.

In some embodiments, the depth of the barcode can then be estimated from a combination of pixel variance within the barcode region and the size of the barcode region in the sub-aperture image. The relationships between barcode depth, and/or variance, and/or size in the image can, for instance, be summarized in a lookup table. This lookup table can be generated empirically (i.e., by calibration) or using analytic models.

In either embodiment, the observed variance and size can be translated from the look up table into a unique depth value for refocusing. Once the depth of the barcode has been estimated, then the image data can be re-focused only with respect to the barcode's image region and depth which can, as discussed above, be beneficial as processing the reduced image will reduce the amount of processing time and resources used to accomplish the process.

The embodiments herein are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

Figure 8A:
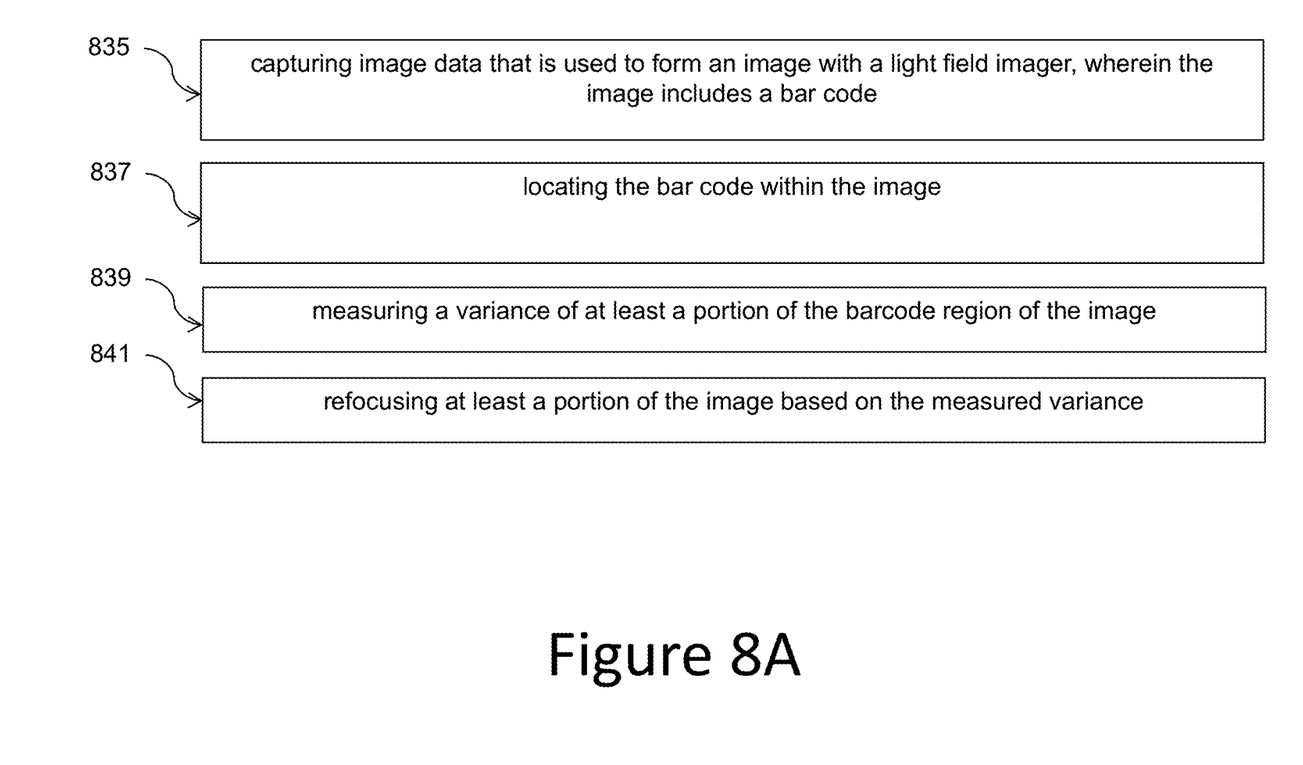
FIGS. 8A and 8B illustrate method embodiments for barcode imaging in accordance with one or more embodiments of the present disclosure.
Figure 8B:
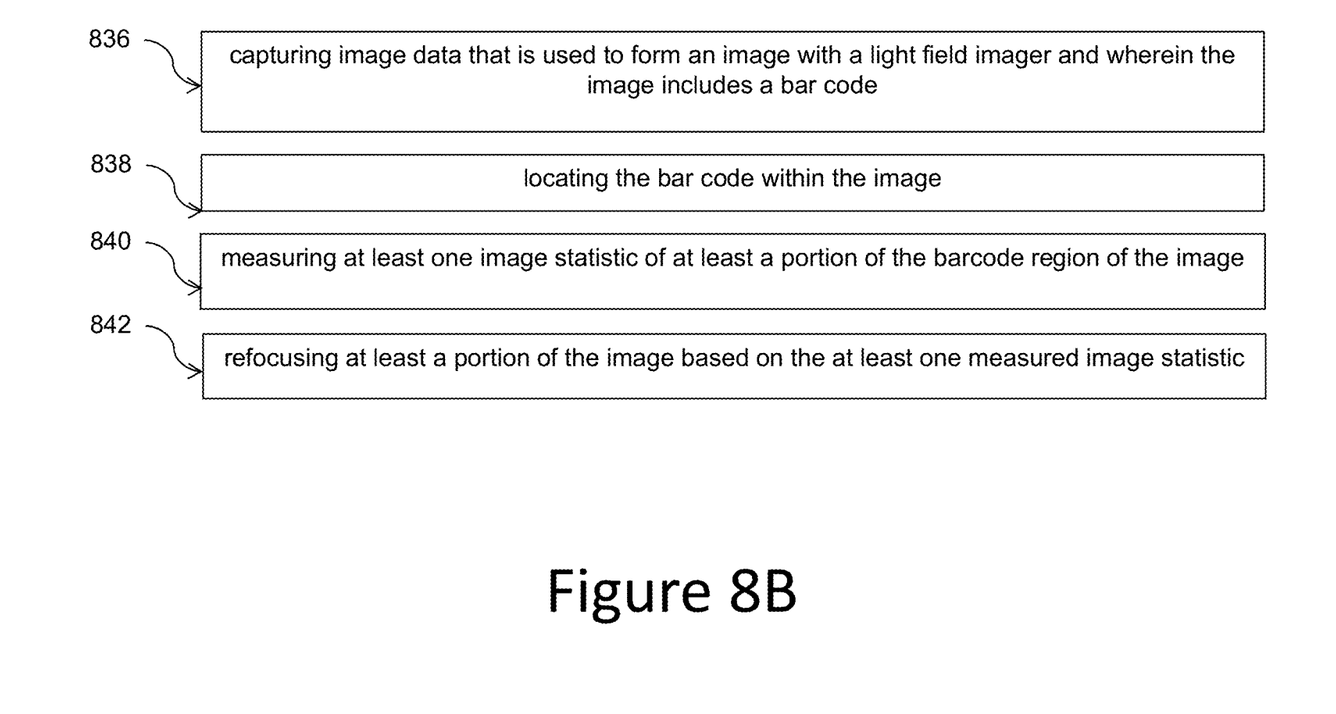

FIGS. 8A and 8B illustrate method embodiments for barcode imaging in accordance with one or more embodiments of the present disclosure. In the method embodiment of FIG. 8A, the method includes capturing image data that is used to form an image with a light field imager, wherein the image includes a barcode, in block 835.

In this manner, the barcode and, in some embodiments, image data of an area surrounding (next to, in the foreground, in the background) the barcode can be captured. In some embodiments, capturing an image data that is used to form an image with a light field imager includes capturing with a light field imager having a plurality of microlenses forming a microlens array.

The method also includes locating the barcode within the image, at block 837. This can be accomplished in a number of ways. For example, the barcode can be located by determining a variance and sampling the image to determine where the barcode is located and what its orientation is as are discussed in more detail herein.

In some embodiments, locating the barcode includes creating a sub-sample image comprising less than all of the image data. Creating a sub-sample image can be accomplished, for example, by selecting a pixel in each of multiple lenslet images.

The method further includes measuring a variance of at least a portion of the barcode region of the image, at block 839. In this embodiment, one or more variances can be measured and can be used to determine that location and/or orientation of one or more barcodes in an image data set. In some embodiments, a method includes measuring multiple variances and comparing variance values to determine an orientation of the barcode.

At block 841, the method includes refocusing at least a portion of the image based on the measured variance. As discussed herein, the variance can also be utilized to refocus (i.e., sharpen) the barcode.

In various embodiments, a method can include determining one or more dimensions of the barcode. The dimensions can be determined by measurement, comparison to known object in the image, comparison to a known side dimension of the barcode, and/or comparison to one or more reference barcode dimensions stored in memory.

In some such embodiments, a method can include comparing the one or more determined dimensions with one or more dimensions stored in a memory of a computing device to determine a distance that the barcode is positioned from the light field imager. In this manner, the size of the barcode can be determined and/or the depth based on the size and/or the one or more dimensions of the barcode. For example, in various embodiments, a method can include comparing the measured variance with one or more variance values stored in a memory of a computing device to determine a distance that the barcode is positioned from the light field imager.

In the method embodiment of FIG. 8B, the method includes capturing image data that is used to form an image with a light field imager and wherein the image includes a bar code, at block 836. This data can be utilized to locate the bar code within the image, as illustrated at block 838.

The method of FIG. 8B also includes measuring at least one image statistic of at least a portion of the barcode region of the image, at block 840. At least a portion of the image can then be refocused based on the at least one measured image statistic.

As used herein, an image statistic can be statistics of the image in the primal domain (first order statistics like average pixel intensity, second order statistics like variance and standard deviation), or statistics of the image in the Fourier domain (including distributional statistics that are used for blue estimation), among other image statistics that may be beneficial to the embodiments of the present disclosure. Examples of suitable statistics include pixel intensity variance and cross-correlation.

In some embodiments the method can include measuring at least one image statistic of at least a portion of the barcode region of the image that includes dividing the image data into multiple data sets, wherein each data set has data in corresponding locations, comparing the data in one or more corresponding locations on the barcode in each data set, and identifying a shift in the image data. In various embodiments, the light field imager has a plurality of microlenses in a microlens array and the multiple data sets correspond to sub-aperture images.

Figure 9:
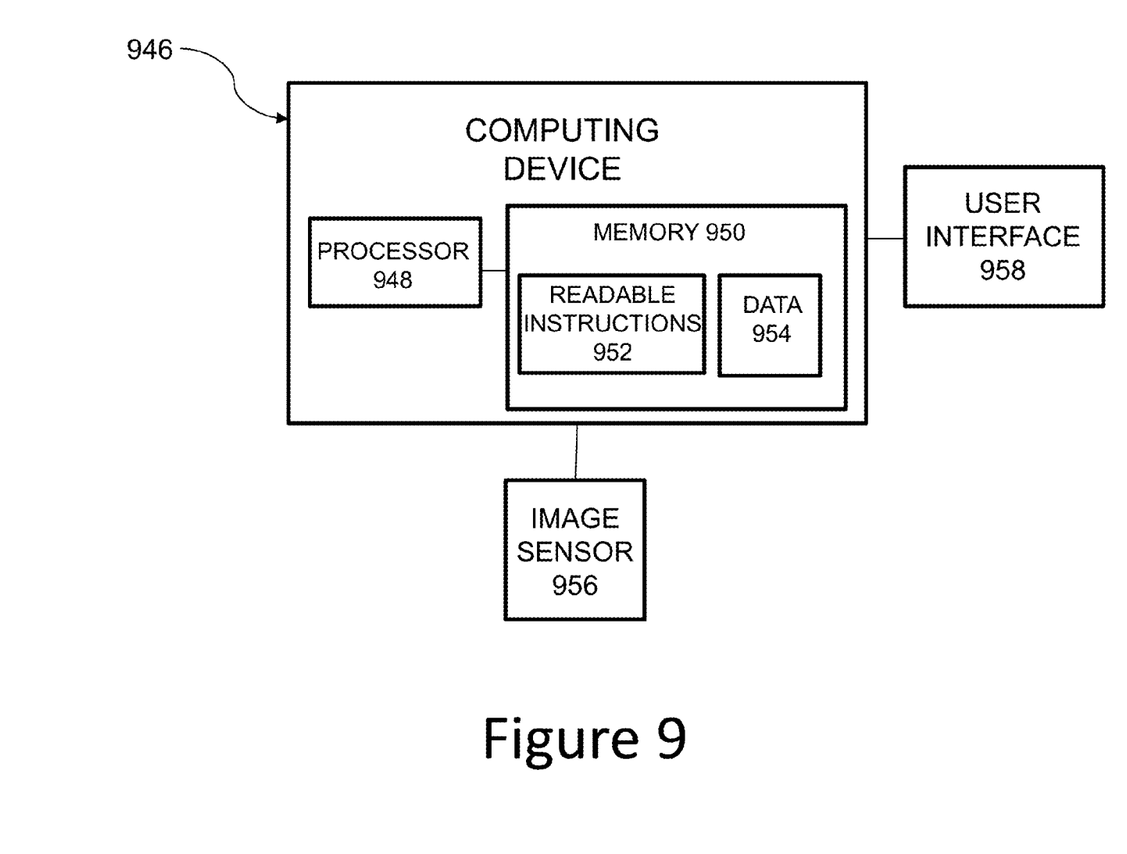
FIG. 9 illustrates a system that can be utilized in accordance with one or more embodiments of the present disclosure.

In some embodiments, the light field imager has a plurality of sensors in a sensor array and wherein each of the multiple data sets correspond to an image from a different sensors. FIG. 9 illustrates a system that can be utilized in accordance with one or more embodiments of the present disclosure. For instance, in various embodiments, the camera or other device having computing functionality can perform some or all of the functions discussed herein.

For example, a computing device 946 (i.e., a device having computing functionality, as described herein, can also include a computer readable medium (CRM) 950 in communication with processing resources 948) can be used by a user via a user interface 958 to accomplish a multitude of functions by executing computing device readable instructions. CRM can be in communication with a device having processor resources. The device can be in communication with a tangible non-transitory CRM storing a set of computer-readable instructions (CRI) 952 executable by one or more of the processor resources, as described herein.

Data 954 can also be stored in CRM and can be used by CRI to accomplish computing tasks. In the embodiment of FIG. 9, CRI can be used to capture image data via and image sensor 956.

This sensor data can then be stored in memory and used in the embodiments of the present disclosure. Additionally, data can include look-up tables, as mentioned above, and CRI can be used to access such tables and utilize the look-up tables for use in embodiments of the present disclosure.

The CRI can also be stored in remote memory managed by a server and represent an installation package that can be downloaded, installed, and executed. The device can include memory resources, and the processor resources can be coupled to the memory resources.

Processor resources 948 can execute CRI that can be stored on an internal or external non-transitory CRM. The processor resources can execute CRI to perform various functions. For example, the processor resources can execute CRI to perform a number of functions.

A non-transitory CRM, as used herein, can include volatile and/or non-volatile memory. Volatile memory can include memory that depends upon power to store information, such as various types of dynamic random access memory (DRAM), among others.

Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM can also include distributed storage media. For example, the CRM can be distributed among various locations. The non-transitory CRM can be integral, or communicatively coupled, to a computing device, in a wired and/or a wireless manner. For example, the non-transitory CRM can be an internal memory, a portable memory, a portable disk, or a memory associated with another computing resource (e.g., enabling CRI's to be transferred and/or executed across a network such as the Internet).

The CRM can be in communication with the processor resources via a communication path. The communication path can be local or remote to a machine (e.g., a computer) associated with the processor resources.

Examples of a local communication path can include an electronic bus internal to a machine (e.g., a computer) where the CRM is one of volatile, non-volatile, fixed, and/or removable storage medium in communication with the processor resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the CRM is remote from the processor resources such as in a network relationship between the CRM and the processor resources. That is, the communication path can be a network relationship. Examples of such a network relationship can include a local area network (LAN), wide area network (WAN), personal area network (PAN), and the Internet, among others. In such examples, the CRM can be associated with a first computing device and the processor resources can be associated with a second computing device.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor, such as a microprocessor.

Provided below are example device embodiments for barcode imaging. In this example the device can include a light field imager having a microlens array. The device can also include memory and processor configured to execute executable instructions stored in the memory to accomplish a variety of functions. For example, in some embodiments, the executable instructions can capture image data that is used to form an image with the light field imager, wherein the image includes a barcode, measure a variance of at least a portion of the image, and determine a distance that the barcode is positioned from the imager based on the measured variance.

In some embodiments, the distance can be determined, for example, by comparing the measured variance to one or more variance values stored in memory. These one or more variance values stored in memory can, for example, each be correlated to a unique distance value.

For instance, a multitude of variance values can be held in a look-up table and each can have a corresponding unique distance value. When a variance is determined, the look-up table can be referenced to determine the distance.

As discussed above, capturing image data that is used to form an image with the light field imager can include an image having multiple barcodes. In some such embodiments, the image includes multiple barcodes at multiple depths and the multiple depths are determined based on the distance that the barcode is positioned from the imager based on the measured variance.

In another embodiment, the device can include a light field imager having a microlens array, a memory, and a processor configured to execute executable instructions stored in the memory. The executable instructions can, for example, capture image data that is used to form an image with the light field imager, wherein the image includes a barcode, determining at least one dimension of the barcode, and determine a distance of the barcode from the light field imager based on the determined dimension.

In some embodiments and as discussed elsewhere herein, the device includes one or more barcode dimensions stored in memory and wherein the memory includes executable instructions to compare the determined at least one dimension of the barcode to the one or more dimensions stored in memory and determines a magnification based on the at least one dimension of the barcode and at least one other dimension stored in memory.

Such embodiments allow for one or more barcodes to be located, their orientation to be determined, and or the barcode to be refocused to create a clearer image of the bar code. In doing so, the method and device embodiments discussed herein allow for such processes to be accomplished more quickly, provide a better barcode image quality, and/or with less resources than previous concepts.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

What is claimed:

1. A method for barcode imaging, comprising:
capturing image data that is used to form an image with a light field imager, wherein the image includes a barcode;
locating the barcode within the image;
measuring a variance of at least a portion of the barcode region of the image; and
translating the measured variance into a depth value used for refocusing at least a portion of the image.

2. The method of claim 1, wherein locating the barcode includes creating a sub-sample image comprising less than all of the image data.

3. The method of claim 2, wherein creating a sub-sample image is accomplished by selecting a pixel in each of multiple lenslet images.

4. The method of claim 1, wherein the method includes measuring multiple variances and comparing variance values to determine the depth of the barcode.

5. The method of claim 1, wherein the method includes determining a barcode's orientation based on the measured gradient.

6. The method of claim 1, wherein the method includes determining one or more dimensions of the barcode.

7. The method of claim 6, wherein the method includes comparing the one or more determined dimensions with one or more dimensions stored in a memory of a computing device to determine a distance that the barcode is positioned from the light field imager.

8. The method of claim 1, wherein capturing an image data that is used to form an image with a light field imager includes capturing with a light field imager having a plurality of microlenses forming a microlens array.

9. The method of claim 1, wherein the method includes comparing the measured variance with one or more variance values stored in a memory of a computing device to determine a distance that the barcode is positioned from the light field imager.

10. A device for barcode imaging, comprising:
a light field imager having a microlens array;
a memory; and
a processor configured to execute executable instructions stored in the memory to:
capturing image data that is used to form an image with the light field imager, wherein the image includes a barcode;
measuring a variance of at least a portion of the image;
translating the measured variance into a depth value used for refocusing at least a portion of the image; and
determining a distance that the barcode is positioned from the imager based on the depth value.

11. The device of claim 10, wherein the distance is determined by comparing the measured variance to one or more variance values stored in memory.

12. The device of claim 11, wherein the one or more variance values stored in memory are each correlated to a unique distance value.

13. The device of claim 10, wherein capturing image data that is used to form an image with the light field imager, includes wherein the image includes multiple barcodes.

14. The device of claim 13, wherein the image includes multiple barcodes at multiple depths of field and wherein the multiple depths of field are determined based on the distance that the barcode is positioned from the imager based on the measured variance.

15. A method for bar code imaging, comprising:
capturing image data that is used to form an image with a light field imager and wherein the image includes a bar code;
locating the bar code within the image
measuring at least one image statistic of at least a portion of the barcode region of the image; and
translating the at least one measured image statistic into a depth value used for refocusing at least a portion of the image.

16. The method of claim 15, wherein measuring at least one image statistic of at least a portion of the barcode region of the image includes:
dividing the image data into multiple data sets, wherein each data set has data in corresponding locations;
comparing the data in one or more corresponding locations on the barcode in each data set; and
identifying a shift in the I mage data.

17. The method of claim 16 wherein the light field imager has a plurality of microlenses in a microlens array and wherein the multiple data sets correspond to sub-aperture images.

18. The method of claim 16, wherein the light field imager has a plurality of sensors in a sensor array and wherein the multiple data sets correspond to images from different sensors.

19. A device for barcode imaging, comprising:
a light field imager having a microlens array;
a memory; and
a processor configured to execute executable instructions stored in the memory to:
capturing image data that is used to form an image with the light field imager, wherein the image includes a barcode;
measuring at least one dimension of the barcode;
translating the at least one measured dimension into a depth value used to locate the barcode within at least a portion of the image; and
determine a distance of the barcode from the light field imager based on the depth value.

20. The system of claim 19, wherein the device includes one or more barcode dimensions stored in memory and wherein the memory includes executable instructions to compare the determined at least one dimension of the barcode to the one or more dimensions stored in memory and determines a magnification based on the at least one dimension of the barcode and at least one other dimension stored in memory.

* * * * *